United States Patent [19]

Nawata et al.

[11] 4,332,845
[45] Jun. 1, 1982

[54] OXYGEN ABSORBENT-CONTAINING BAG

[75] Inventors: Takanari Nawata; Toshio Komatsu, both of Tokyo; Yukio Kondoh, Yono, all of Japan

[73] Assignee: Mitsubishi Gas Chemical Company, Inc., Tokyo, Japan

[21] Appl. No.: 217,413

[22] Filed: Dec. 11, 1980

[30] Foreign Application Priority Data

Dec. 21, 1979 [JP] Japan .............................. 54-177432
Jun. 26, 1980 [JP] Japan .............................. 55-89576

[51] Int. Cl.³ .............................................. B32B 3/10
[52] U.S. Cl. ...................................... 428/35; 428/137
[58] Field of Search ...................... 428/35, 137–138; 215/228; 206/439, 484.1

[56] References Cited

U.S. PATENT DOCUMENTS

| | | | |
|---|---|---|---|
| 3,058,863 | 10/1962 | Gaines et al. | 428/114 |
| 3,095,315 | 6/1963 | Magill, Jr. et al. | 428/317 |
| 3,522,077 | 7/1979 | Kaczmarek | 428/421 |
| 3,637,418 | 1/1972 | Dotson et al. | 428/332 |
| 4,104,192 | 8/1978 | Yoshikawa et al. | 252/188 |
| 4,113,652 | 9/1978 | Yoshikawa et al. | 252/188 X |
| 4,127,503 | 11/1978 | Yoshikawa et al. | 252/437 X |
| 4,166,807 | 9/1979 | Komatsu et al. | 252/188 X |
| 4,192,773 | 3/1980 | Yoshikawa et al. | 252/188 X |
| 4,199,472 | 4/1980 | Ohtsuka et al. | 252/188 X |

*Primary Examiner*—Henry F. Epstein
*Attorney, Agent, or Firm*—Browdy and Neimark

[57] ABSTRACT

At least part of the material constituting the bag in which an oxygen absorbent is sealed is composed of a laminated sheet in which a gas permeable sheet is laminated to one or both sides of a microporous film to provide a lamination the two outside layers of which have different softening points, the layer having a lower softening point constituting the inner surface of the bag is disclosed. The bag of this invention can be produced at a high speed by using an ordinary heat-seal machine.

5 Claims, 8 Drawing Figures

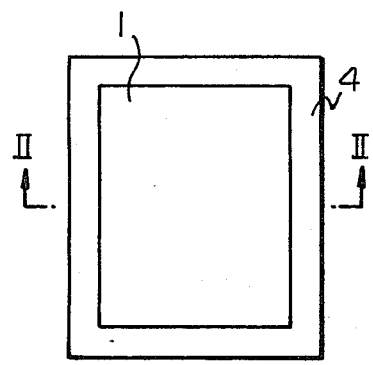
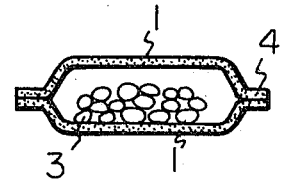
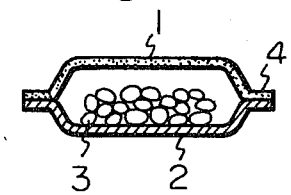
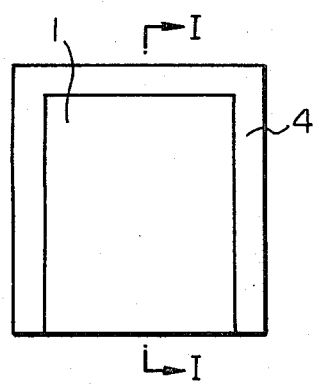
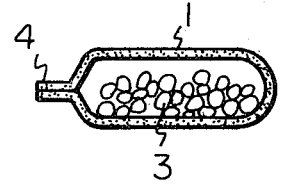
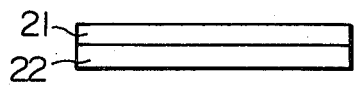
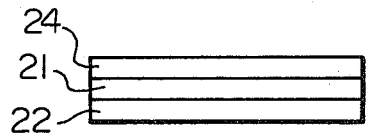

OXYGEN ABSORBENT-CONTAINING BAG

BACKGROUND OF THE INVENTION

This invention relates to a bag having an oxygen absorbent, characterized in that at least part of the material constituting the bag is composed of a microporous film having a plurality of fine openings, and a gas permeable sheet.

In order to preserve foodstuffs, it is necessary to prevent the foodstuffs from getting moldy and from putrefying. In the prior art methods, the gas present in the inner part of a content-charged container was replaced by an inert gas or the container was sterilized. However, replacement of oxygen by an inert gas requires large-scale apparatus and sterilization of the filled container may cause change in quality of the contents. Additives, such as antioxidant, have been used for preserving foodstuffs. However, recently, governments have started to regulate the use of additives for foods, since some additives have been found to be injurious to humans.

Molds or eumycetes, bacteria and higher organisms such as insects tend to disturb preservation of foodstuffs. These mold eumycetes, bacteria and insects live and grow in the presence of oxygen and cause putrefaction and change in quality of foodstuffs.

Therefore, if oxygen can be selectively removed from the empty space of the filled container, the problems of putrefaction and change in quality of foodstuffs can be overcome, and it will become possible to preserve foodstuffs a long time.

A bag having an oxygen absorbent in which at least part of the material constituting the bag is composed of a microporous film was described in U.S. Ser. No. 119,876 filed on Feb. 8, 1980 and now abandoned, assigned to the assignee of this invention.

However a microporous film is mono-layer film, so it is difficult to heat-seal the microporous film by means of conventional packaging machines. The reason is that when two sheets of mono-layer films are adhered by melting an inside portion of the mono-layer film, melted film is adhered to heat-seal bars or heat rolls of the machine. A special heat-sealer, such as impulse heat-sealer, is necessary in order to heat-seal mono-layer film. When such a special heat sealer is used in an automatic packaging machine in order to heat-seal the mono-layer film, it is impossible to operate the automatic packaging machine at a high speed. So, when the mono-layer film is heat-sealed by impulse heat sealer, a decrease in efficiency is unavoidable. In addition, the microporous film is weakened. So a microporous film is not practical as a packaging material for packing an oxygen absorbent.

SUMMARY OF THE INVENTION

An object of this invention is to provide a sheet material for a bag for packing an oxygen absorbent, which is heat-sealable at a high speed by using an ordinary heat seal machine and which has sufficient strength.

This invention relates to a bag in which an oxygen absorbent is sealed, characterized in that at least part of the material constituting the bag is composed of a laminated sheet, in which a gas permeable sheet is laminated to one or both sides of a microporous film to provide a lamination, the two outside layers of which have different softening points, the layer having a lower softening point constituting the inner surface of the bag.

BRIEF DESCRIPTION OF THE DRAWINGS

FIGS. 1 and 2(a) show a first embodiment of the bag of this invention, and FIG. 1 is a plane view of the bag and FIG. 2(a) is a fragmentary sectional view of the bag along II—II line of FIG. 1;

FIG. 2(b) shows a fragmentary sectional view of a second embodiment of the bag.

FIGS. 3 and 4 show a third embodiment of the bag of this invention, and FIG. 3 is a plane view of the bag and FIG. 4 is a fragmentary sectional view of the bag along I—I line of FIG. 3.

FIGS. 5–7 show a fragmentary sectional view each of a variety of laminated sheets.

DETAILED DESCRIPTION OF THE INVENTION

By the term "microporous film" is meant a film having a plurality of fine openings and being gas-permeable, but water-impermeable when there is no difference between pressure outside the bag and pressure in the bag. The size of the openings is preferably in the range of 0.01–50 microns, and a distance across the short axis is less than 2 microns. Materials constituting the film include plastics, such as polyethylene, polypropylene, poly(fluorinated ethylene) and the like. The microporous film employed in the practice of this invention may be prepared by: cold orientation of film; orientation of different substance-containing film; extraction of different substance from different substance-containing film; extraction of different substance-containing film, followed by orientating the so-treated film; laminatings of non-woven fabrics; cross dispersing of bundle of fibers, followed by heat-pressing the resulting material; and irradiation of film with electron beam. For example, suitable microporous films are commercially available, and are sold under the names Celgard (Celanese Corp.), FP-2 (Asahi Chemical Industry), NOP (Nippon Oil Chemical Co., Ltd.), Nitto Flon (NTF) (Nitto Electric Industrial Co., Ltd.), Cellpore NW01 (Sekisui Chemical Co., Ltd.), Gore-Tex (Gore & Co., GmbH), Polyflon Paper (Daikin Industry Co.), Tyvek (E. I. Dupont), NF sheet (Tokuyama Soda Chemical Co.) and so on.

In general the film has a Gurley type air permeability of 0.01–10,000 sec./100 ml, preferably 1–1,000 sec./100 ml.

The term "oxygen absorbent" in the specification and the claims means an agent for absorbing or removing oxygen present in the atmosphere of the container. Examples of the oxygen absorbents employed in the practice of this invention are disclosed in U.S. Pat. No. 4,113,652 by Yoshikawa et al patented on Sept. 12, 1978; U.S. Pat. No. 4,104,192 by Yoshikawa et al patented on Aug. 1, 1978; U.S. Pat. No. 4,199,472 by Ohtsuka et al patented on Apr. 22, 1980; U.S. Pat. No. 4,127,503 by Yoshikawa et al patented on Nov. 28, 1978; U.S. Pat. No. 4,166,807 by Komatsu et al patented on Sept. 4, 1979; and U.S. Pat. No. 4,192,773 by Yoshikawa et al patented on Mar. 11, 1980, which are incorporated herein. Examples of the oxygen absorbents include reducing agent, such as iron powder, oxalates, sulfites, hydrogen sulfites, dithionites, pyrogallol, Rongalit, glucose, copper amine complex, zinc powder and the like, and any composition containing the reducing agent. A solid oxygen absorbent, a solid carrier impregnated with a liquid or semi-liquid oxygen absorbent, or a liquid or semi-liquid oxygen absorbent can be used as the oxygen absorbent of this invention. The solid oxygen absorbent and the solid carrier impregnated with the liquid or semi-liquid oxygen absorbent are preferred.

Examples of the gas permeable sheets include (a) a paper, cloth, non-woven fabric or a lamination of two or more of them (b) a plastic film with through holes of 100–3,000 or a lamination of two or more plastic films with through holes of 100–3,000, and (c) composite sheet composed of (a) paper, cloth, non-woven fabric or a lamination of two or more of them and (b) a plastic film with through holes of 100–3,000μ or a lamination of two or more plastic films with through holes of 100–3,000μ. Examples of the plastic films include polyethylene, polypropylene, polytetrafluoroethylene, Nylon (trade name), polyester, ethylene-vinyl acetate copolymer, ionomer, cellulose derivatives and the like.

FIGS. 1 and 2(a) show one embodiment. The elements are: laminated sheet 1, and oxygen absorbent 3. The bag is made of only the laminated sheet. However, the laminated sheet is costly, so one of the two side sheets constituting the bag may be a laminated sheet and the other may be conventional gas impermeable film as shown in FIG. 2(b). Examples of the gas impermeable films include polyethylene film, polypropylene film, poly(fluorinated ethylene) Nylon film, polyester film, ethylene-vinyl acetate copolymer film, ionomer film, cellulose derivative film and the like, or a lamination thereof.

FIGS. 3 and 4 show a third embodiment. The elements are: laminated sheet 1, and oxygen absorbent 3. The bag is made of only the laminated sheet.

FIGS. 5–7 show embodiments of a variety of laminated sheets. In FIGS. 5–7, the elements are microporous film 21, gas permeable sheet 22 having a lower softening point than that of microporous film 21 gas permeable film 23 having a higher softening point than that of microporous film 21 and gas permeable sheet 24 having a softening point equal to or higher than that of microporous film 21. A bag is made of the laminated sheet so that the layer having a lower softening point constitutes the inner surface of the bag.

In the laminated sheet as shown in FIG. 6, hot melt adhesive having a lower softening point than that of microporous film 21 may be coated on the microporous film.

The bags, as explained above, can be used for preserving foodstuffs. For example, when the bag is packed with foodstuff in a package film so as to seal the bag and the foodstuff, the oxygen absorbent contained in the bag absorbs oxygen present in the package, whereby putrefaction or change in quality of the foodstuff can be prevented. The bags can be also used for preserving materials other than foodstuffs.

Since the laminated sheet constituting the bag is water impermeable, the bag can be packed with liquid or semi-liquid foodstuffs. In this case, the oxygen absorbent present in the bag is completely prevented from contact with the liquid or semi-liquid foodstuffs of a container.

What is claimed is:

1. A bag in which an oxygen absorbent is sealed, wherein at least part of the material constituting the bag is composed of a laminated sheet comprising a microporous film having a gas permeable sheet laminated to one or both sides thereof;
   wherein said gas permeable sheet is selected from the group consisting of
   (a) paper, cloth, non-woven fabric, or a lamination of two or more of said paper, cloth and non-woven fabric,
   (b) a plastic film with through holes of 100–3,000μ, or a lamination of two or more plastic films with through holes of 100–3,000μ, and
   (c) a composite sheet composed of a member of group (a) and a member of group (b) as defined above;
   wherein the microporous film is a mono-layer film having a plurality of fine openings and being gas-permeable, but water-impermeable when there is no difference between pressure outside the bag and pressure in the bag, in which the size of the openings are in the range of 0.01–50 microns, with the distance across the short axis thereof being less than 2 microns; and
   wherein the layer of said laminated sheet which has the lowest softening point constitutes the inner surface of the bag.

2. The bag as defined in claim 1, wherein said gas permeable sheet is laminated to one side of said microporous film, and the softening point of said gas permeable sheet is lower than that of said microporous film.

3. The bag as defined in claim 1, wherein said gas permeable sheet is laminated to one side of said microporous film, and the softening point of said gas permeable sheet is higher than that of said microporous film.

4. The bag as defined in claim 2, wherein one of said gas permeable sheets, having a softening point equal to or higher than that of said microporous film, is laminated on the other side of said microporous film.

5. The bag as defined in claim 1 wherein the oxygen absorbent contains iron powder as a reducing agent.

* * * * *